(12) United States Patent
Ishikawa et al.

(10) Patent No.: US 7,069,793 B2
(45) Date of Patent: Jul. 4, 2006

(54) ULTRASONIC FLOW METER AND ULTRASONIC SENSOR

(75) Inventors: Hiroaki Ishikawa, Hamura (JP); Kazuyoshi Shimizu, Ohme (JP); Ayumi Sekine, Hamura (JP)

(73) Assignee: Kaijo Sonic Corporation, Hamura (JP)

( * ) Notice: Subject to any disclaimer, the term of this patent is extended or adjusted under 35 U.S.C. 154(b) by 171 days.

(21) Appl. No.: 10/965,158

(22) Filed: Oct. 14, 2004

(65) Prior Publication Data

US 2005/0097968 A1    May 12, 2005

(30) Foreign Application Priority Data

Nov. 11, 2003  (JP) .............................. 2003-381771
Aug. 31, 2004  (JP) .............................. 2004-253109

(51) Int. Cl.
*G01F 1/20* (2006.01)
(52) U.S. Cl. .................................................. 73/861.18
(58) Field of Classification Search ............. 73/861.27, 73/861.218
See application file for complete search history.

(56) References Cited

U.S. PATENT DOCUMENTS

| | | | |
|---|---|---|---|
| 3,987,674 A | 10/1976 | Baumoel | |
| 4,098,117 A * | 7/1978 | Baumoel | 73/861.18 |
| 5,594,181 A | 1/1997 | Strange | |
| 6,595,070 B1 * | 7/2003 | Cole | 73/861.27 |
| 6,644,130 B1 * | 11/2003 | Imai et al. | 73/861.27 |

FOREIGN PATENT DOCUMENTS

| | | |
|---|---|---|
| JP | 61-132823 | 6/1986 |
| JP | 10-122923 | 5/1998 |
| JP | 2001-074527 | 3/2001 |
| JP | 2002-221440 | 8/2002 |

\* cited by examiner

*Primary Examiner*—Hezron Williams
*Assistant Examiner*—Jewel V. Thompson
(74) *Attorney, Agent, or Firm*—Frishauf, Holtz, Goodman & Chick, P.C.

(57) ABSTRACT

An ultrasonic flow meter for measuring a flow rate in a flow path is provided having ultrasonic sensors each of which includes a semicircular or substantially circular disk shaped transducer. Such transducers are detachably mountable on an envelope of the flow path. The thickness of the ultrasonic sensors in the direction of the length of the flow path is reduced to improve a detection resolution. A plurality of the ultrasonic sensors are mounted on the flow path while keeping a predetermined distance therebetween in a length direction of the flow path, so that the flow rate can be measured from the difference of propagation times of ultrasonic waves between the ultrasonic sensors.

14 Claims, 10 Drawing Sheets
(1 of 10 Drawing Sheet(s) Filed in Color)

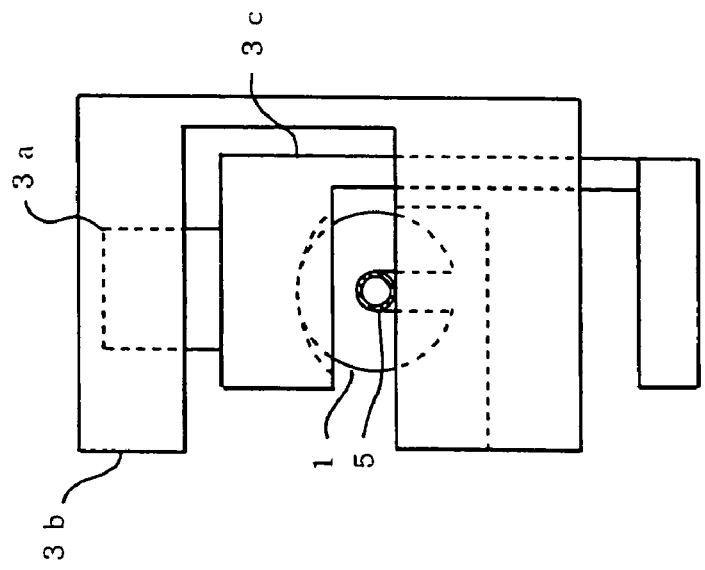
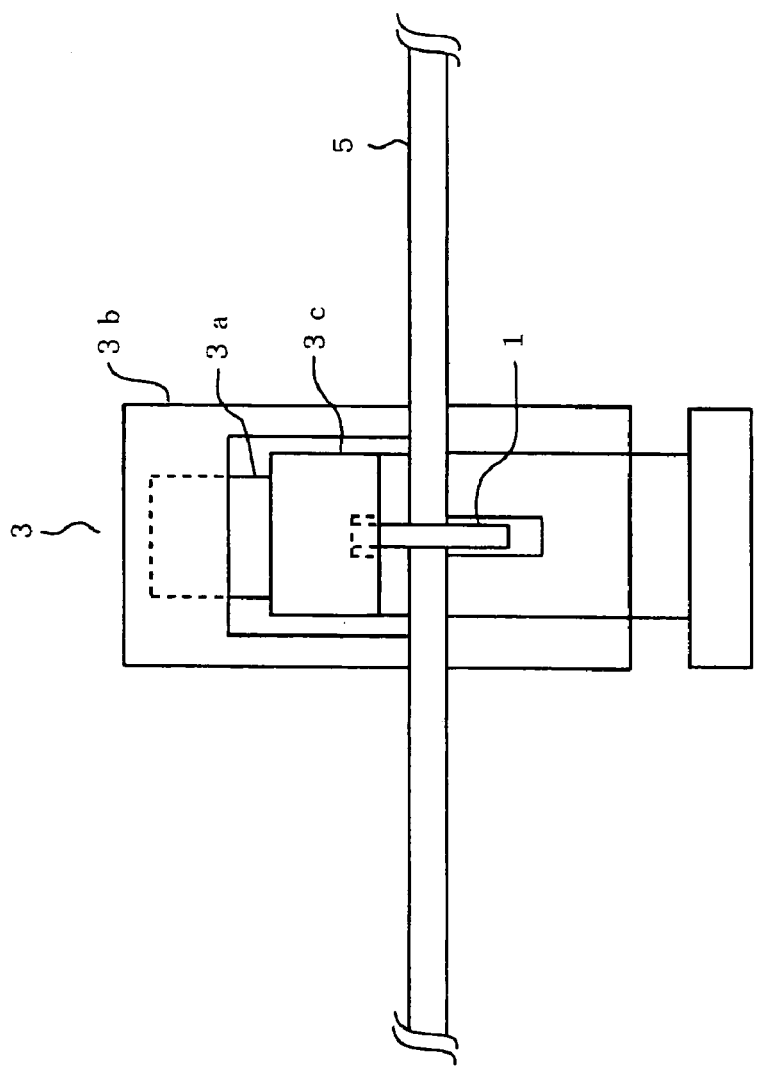
FIG.4B
FIG.4A

ULTRASONIC FLOW METER AND ULTRASONIC SENSOR

BACKGROUND OF THE INVENTION

1. Field of the Invention

The present invention relates to an ultrasonic flow meter and an ultrasonic sensor for measuring a flow rate of liquid in a flow path by an ultrasonic wave and, more specifically, to an ultrasonic flow meter having ultrasonic sensors which can be easily mounted to the flow path and which are capable of accurately measuring the flow rate of the liquid even when the inner diameter of the flow path is small.

2. Description of the Prior Art

Hitherto, an ultrasonic flow meter for measuring a flow rate of liquid in a flow path has been used in a semiconductor manufacturing apparatus or in equipment in a plant. The ultrasonic flow meter is an instrument for measuring a flow rate by measuring a difference of propagation times of an ultrasonic wave in liquid in the flow path between upstream and downstream directions. Various proposals regarding the ultrasonic flow meter using the difference of propagation times of the ultrasonic wave have been provided as described below.

JP-A-10-122923 discloses an ultrasonic flow meter having two annular ultrasonic wave transducers provided on the outer peripheral surface of a measuring tube so as to be tightly fitted thereon at a predetermined interval, in which, when the measuring tube is filled with a fluid, an ultrasonic wave generated by a transducer is transmitted through a tube wall to a fluid, then is propagated toward the center of the transducer (center of the straight pipe), and then is redirected at a right angle and transmitted forward and backward along the length of the tube.

JP-A-61-132823 discloses an ultrasonic flow meter having a pair of ring-shaped transducers, each having a radius at a hollow portion thereof which is equivalent to an inner diameter of a flow path, which are mounted via acoustic insulating material at an adequate interval so that the center axis of the ring-shaped transducers and the center axis of the flow tube are aligned.

U.S. Pat. No. 5,594,181 discloses an ultrasonic flow meter in which two ring-shaped piezoelectric transducers are fitted at a predetermined interval into a solid portion of a pipe for measuring a flow rate of a liquid flowing between the transducers.

The ultrasonic flow meters described above are constructed to measure propagation times of ultrasonic waves by means of two ring-shaped ultrasonic transducers provided on the measuring tube while switching each ultrasonic transducer alternately between an ultrasonic transmission mode and an ultrasonic reception mode, and then calculating the flow rate in the tube. Such ultrasonic flow meters using ring-shaped ultrasonic transducers are useful for measuring a flow rate in a narrow tube which accommodates a minute amount of flow.

U.S. Pat. No. 3,987,674 discloses an ultrasonic flow meter in which a storage case including an ultrasonic transducer integrated therein is fixed along the length of the flow path by means of a mounting device or the like, and in which another storage case is disposed and fixed thereon at a predetermined interval so that the ultrasonic transducers face each other (clamp-on system).

JP-A-2001-74527 discloses a multipass system ultrasonic flow meter in which a plurality of pairs of transducers are provided, wherein each pair propagates an ultrasonic wave in the direction of flow of fluid and in the opposite direction therefrom, so that the number of traverse lines increases and thus variations in measurement caused by variations in distribution of flow velocity are reduced.

JP-A-2002-221440 discloses an ultrasonic flow meter including measuring units provided on a measuring tubular body at an interval, wherein the measuring units each include an arcuate transducer fixed on part of the peripheral portion along the circumference of the tubular body with adhesive agent.

In recent years, in a process of manufacturing semiconductors, there is a trend to use a small amount of high-priced chemicals as a result of miniaturization of the process, to reduce manufacturing cost, or for environmental reasons. Therefore, the demands for more accurate management of the flow rate of chemicals in a flow path of a small aperture are increasing.

However, the ultrasonic flow meters and the ultrasonic sensors in the prior art have the following problems.

The ultrasonic flow meter employing ring-shaped sensors may be designed to secure a long distance between the sensors, and thus a small flow rate can be measured with a high degree of accuracy. However, when mounting the ring-shaped sensors on the flow path, the piping of the flow path has to be disassembled, and hence ring-shaped sensors cannot be employed in an apparatus in which the piping of the flow path cannot be disassembled (Problem 1).

In the case of a clamp-on system, as shown in the layout of ultrasonic sensors 20 in FIG. 10A, since the distance (L) between the ultrasonic sensors 20 has to be reduced when the aperture of a flow path 5 is reduced as in FIG. 10B, the difference in propagation times of ultrasonic waves generated by the flow of liquid becomes small, making it difficult to achieve measurement with a high degree of accuracy (Problem 2).

In the case of the ultrasonic flow meter employing the multipass system, though it is adapted to reduce errors or variations in measurement resulting from variations in distribution of flow velocity by increasing the number of traverse lines, it is difficult to realize multiple traverse lines by providing a plurality of ultrasonic sensors when the aperture of the flow path is small (Problem 3).

As shown in FIG. 11B, in the case of the ultrasonic flow meter on which arcuate ultrasonic transducers 21 are fixed with an adhesive agent, the length L between the ultrasonic sensors 21 may be increased, and the clamp-on system is also possible. However, since the dimension $t_o$ of the transducer along the flow path 5 in the direction of the length of the flow path (the direction of liquid flow) is large, detection resolution in the direction along the flow path 5 ($t_o/L$) is reduced, and thus sufficient measuring accuracy cannot be obtained (Problem 4). This is because the detection resolution of the ultrasonic sensors is reduced due to the large ratio of the dimensions of the two-way transmission sensors to the distance between the ultrasonic sensors.

Still, further, the ultrasonic sensor employing a transducer which is large in a dimension in the direction along the length of the flow path has a problem in that the sensitivity of the transducer to transmission of the ultrasonic wave being propagated in the direction along the flow path is low (Problem 5). This is because the area of a sound source increases when the dimension of the transducer in the direction of the length of the flow path is large, and thus directivity of the ultrasonic waves transmitted by the ultrasonic sensor increases correspondingly and, as a consequence, efficiency of propagation of the ultrasonic waves in liquid is lowered, whereby sensitivity to transmission is lowered.

SUMMARY OF THE INVENTION

In view of the above-described Problems 1 to 5, it is an object of the present invention to provide an ultrasonic flow meter having ultrasonic sensors which can be easily mounted to the flow path and which are capable of measuring the flow rate with a high degree of accuracy even when the inner diameter of the flow path is small.

According to the present invention, an ultrasonic flow meter is provided which includes at least two ultrasonic sensors each for emitting and detecting ultrasonic waves. The ultrasonic sensors are disposed at a predetermined interval in a length direction of a flow path so as to measure a flow rate from a difference in propagation times of the ultrasonic waves between the ultrasonic sensors. Each of the ultrasonic sensors comprises a semicircular disk shaped transducer that has a notch which comes into tight contact with an envelope of the flow path so as to be detachably mounted on the envelope of the flow path. The ultrasonic waves which are emitted from the ultrasonic sensors are propagated in all directions as spherical waves along the flow path in upstream and downstream directions so as to be directly detected by each other.

Alternatively, the ultrasonic sensors of the flow meter according to the present invention may each comprise a substantially circular disk shaped transducer having a notch. The substantially circular disk shaped transducer detachably mounted to an envelope of the flow path so as to substantially align a center of the flow path substantially with a center of the substantially circular disk.

According to the present invention, since the ultrasonic sensors are formed with a notch, the ultrasonic sensors can be fixed to the flow path with an adhesive agent or mounted to the flow path by means of a mounting device through a one-touch operation, and thus the scope of application of the flow rate measurement may be enlarged.

Since the ultrasonic sensors of the present invention may be mounted on the flow path at an increased distance as in the case of the ring-shaped ultrasonic sensors in the prior art, measurement of the flow rate may be performed with a high degree of accuracy even when the aperture of the flow path is small.

Since measurement by combining measured values from pairs of sensors may be performed by disposing more than two sensors on the flow path, measurement of a high degree of accuracy is achieved also for transient flow including laminar flow, turbulent flow, or for pulsating flow.

Since detection resolution of the ultrasonic sensors may be increased by reducing the thickness of the ultrasonic sensors, reduction of errors resulting from the detection resolution is achieved.

In addition, by reducing the thickness of, and increasing the outer diameter of, the semicircular or substantially circular disk shaped transducers of the ultrasonic sensors, reduction of a resonance frequency of the ultrasonic sensors is achieved. Accordingly, attenuation of ultrasonic vibrations may be controlled, and the effect of noise or the like may be reduced, whereby measurement of flow rate with high degree of accuracy is achieved.

BRIEF DESCRIPTION OF THE DRAWINGS

This patent or application contains at least one drawing executed in color. Copies of this patent or patent application publication with color drawings(s) will be provided by the Office upon request and payment of the necessary fee.

FIG. 4A is a front view showing a state in which the ultrasonic sensor is fixed to the flow path by means of a mounting device;

FIG. 4B is a side view of the state shown in FIG. 4A;

DESCRIPTION OF THE PREFERRED EMBODIMENTS

Figure 1A:
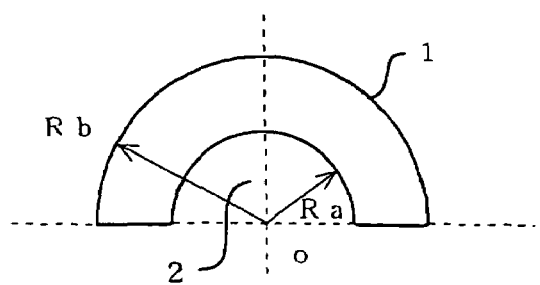
FIG. 1A is a front view showing a configuration of an ultrasonic sensor including a semicircular disk formed with a notch.

Referring now to the drawings, an embodiment of an ultrasonic flow meter having ultrasonic sensors according to the present invention will be described. The ultrasonic flow meter according to the present invention is constructed in such a manner that the ultrasonic sensors can be easily mounted to the flow path and the flow rate can be measured with a high degree of accuracy even when the inner diameter of the flow path is small.

Figure 1B:
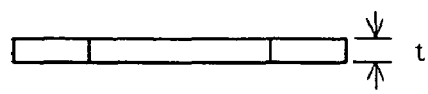
FIG. 1B is a bottom view of the ultrasonic sensor.

As shown in FIG. 1A, an ultrasonic sensor 1 is a sensor including an ultrasonic transducer, which is formed to be thin in the direction of length of the flow path 5, and which includes a semicircular disk with an outer radius of Rb having a notch 2 defining a semicircular space with an inner radius of Ra. As shown in FIG. 1B, the semicircular disk is formed to have thickness t. The notch 2 of the ultrasonic sensor 1 is formed for mounting the ultrasonic sensor 1 to the flow path 5 (shown in FIG. 3 and FIG. 4), and is configured so that the inner surface of the ultrasonic sensor 1 and the envelope of the flow path 5 come into contact with each other. The thickness t of the ultrasonic sensor 1 in the direction of the length of the flow path 5 (the direction of liquid flow) is designed so that the ratio of the thickness t with respect to the length L between the ultrasonic sensors (t/L) does not exceed a reference value s corresponding to a detection resolution of the ultrasonic sensor. In other words, the ratio (t/L) is determined to be (t/L)≦s. The reference value s is the detection resolution required for the ultrasonic sensor for obtaining the accuracy required for measuring a flow rate.

The notch 2 shown in FIG. 1 and FIG. 2 is formed for detachably mounting the ultrasonic sensor 1 to the envelope of the flow path 5.

Figure 2A:
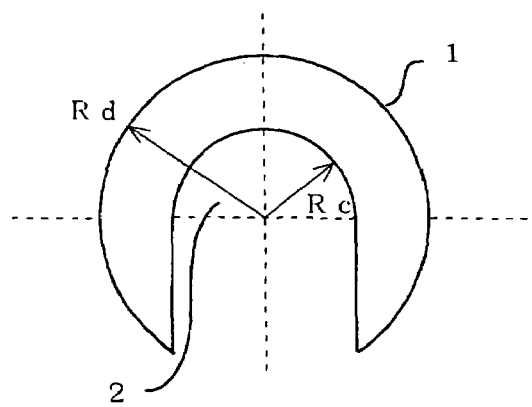
FIG. 2A is a front view showing a configuration of an ultrasonic sensor including a substantially circular disk formed with a notch.
Figure 2B:
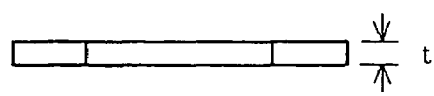
FIG. 2B is a bottom view of the ultrasonic sensor shown in FIG. 2A.

The ultrasonic sensor 1 shown in FIG. 1 includes a semicircular disk having a semicircular notch, while the ultrasonic sensor 1 shown in FIG. 2A includes a substantially circular disk with an outer radius of Rd formed with a notch 2 having a semicircular portion with a radius of Rc and a portion cut out so as to have an inner surface extending substantially perpendicularly from a diameter of the semicircular portion to an outer periphery of the substantially circular disk, and having a width corresponding to the diameter 2Rc of the semicircle so that the center of the flow path 5 (FIG. 3B) substantially coincides with the center of the substantially circular disk. As shown in FIG. 2B, the substantially circular disk having the notch 2 is formed to have a thickness of t.

The ultrasonic sensor 1 shown in FIG. 1 and FIG. 2 is formed of a piezoelectric material such as a PZT (lead zirconate titanate) ceramic material. The ultrasonic sensor 1 is provided with an electrode (not shown) for applying a voltage to a transducer or for picking up the voltage generated at the transducer. A lead wire is connected to the electrode of the transducer so that application of the voltage and detection of the voltage may be performed from the outside. The ultrasonic sensor is adapted to be driven by a voltage of 100 KHz to 1 MHz in frequency.

The cutout range of the notch 2 of the ultrasonic sensor 1 is from the semicircular shape shown in FIG. 1 to the shape formed by cutting out part of the substantially circular disk as shown in FIG. 2. Variations in size of the notch 2 within this range do not affect the measuring accuracy.

Figure 3A:
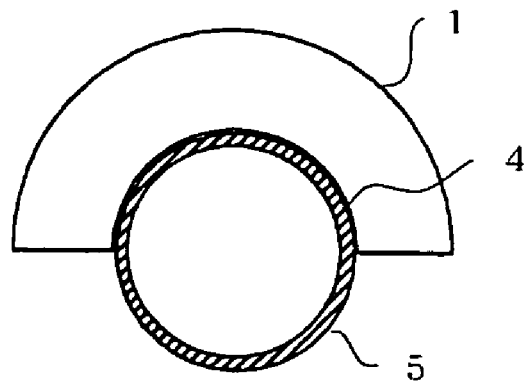
FIG. 3A is a cross-sectional view showing a state in which the ultrasonic sensor including a semicircular disk formed with a notch is fixed to a flow path with an adhesive agent.
Figure 3B:
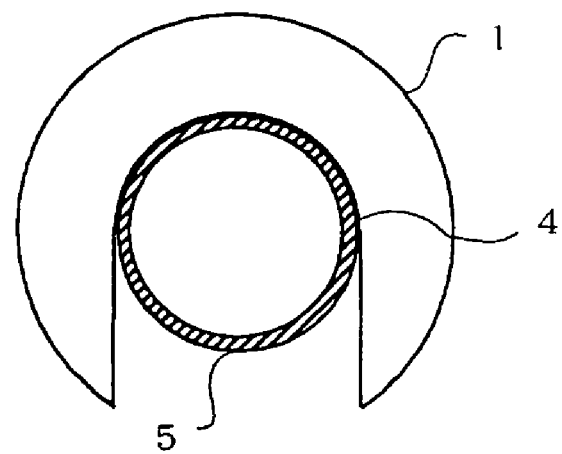
FIG. 3B is a cross-sectional view showing a state in which the ultrasonic sensor including a substantially circular disk formed with a notch is fixed to the flow path with an adhesive agent.

FIG. 3A is a cross-sectional view showing a state in which the ultrasonic sensor 1 including the semicircular disk formed with the notch 2 is fixed to the flow path 5 with an adhesive agent 4. FIG. 3B shows a state in which the ultrasonic sensor 1 including the substantially circular disk formed with the notch 2 is fixed to the flow path 5 with an adhesive agent 4. As shown in FIGS. 3A and 3B, the ultrasonic sensor 1 is mounted so that substantially half of the outer periphery of the flow path 5 comes into tight contact with the inner periphery of the ultrasonic sensor 1, and the ultrasonic sensor 1 is fixed to the outer periphery of the flow path 5 via the adhesive agent 4. Ultrasonic vibrations are transmitted from the inner peripheral portion of the ultrasonic sensor 1 that is in contact with the outer periphery of the flow path 5 via the adhesive agent 4.

While an example in which the ultrasonic sensor 1 is fixed to the flow path 5 using the adhesive agent 4 is shown in the fixing method shown in FIGS. 3A and 3B, a method for fixing the ultrasonic sensor 1 to the flow path 5 by means of a mounting device will be described below.

FIGS. 4A and 4B show a state in which the ultrasonic sensor 1 including the substantially circular disk formed with the notch 2 is fixed to the flow path 5 by means of the mounting device 3. As shown in FIGS. 4A and 4B, the mounting device 3 includes an upper limit stopper 3b, a lower limit stopper 3c, and a spring 3a. The upper limit stopper 3b is shaped like a final bracket, and is attached with the spring 3a as a resilient member on the upper portion. The upper portion of the lower limit stopper 3c comes into contact with the other end of the spring 3a. The upper limit stopper 3b is formed with a notch in the lower portion so as to prevent the ultrasonic sensor 1 from coming into contact therewith. The lower limit stopper 3c is shaped like a final bracket, and is formed with an arcuate notch in the upper portion thereof so as to come into contact with part of the outer periphery of the ultrasonic sensor 1. The midsection of the lower limit stopper 3c penetrates through the lower portion of the upper limit stopper 3b, so that the lower limit stopper 3c is capable of moving in a vertical direction. The upper limit stopper 3b and the lower limit stopper 3c are connected with each other via the spring 3a. The lower limit stopper 3c and the upper limit stopper 3b are formed of plastic or the like so as to absorb vibrations from the ultrasonic sensor 1 and to prevent such vibrations from being transmitted to other portions.

When mounting the ultrasonic sensor 1 to the flow path 5 by means of the mounting device 3, the semicircular portion of the notch 2 of the ultrasonic sensor 1 comes into contact with a predetermined position of the envelope of the flow path 5, and then the mounting device 3 is slid into place while pushing up the lower limit stopper 3c so as to clamp the ultrasonic sensor 1, so that the notch on the upper portion of the lower limit stopper 3c comes into contact with part of the outer periphery of the ultrasonic sensor 1. Consequently, the lower portion of the upper stopper 3b comes into contact with the flow path 5, and the ultrasonic sensor 1 is forced down by a spring pressure applied from above so that the envelope of the flow path 5 and the ultrasonic sensor 1 are kept constantly in tight contact with each other. By using the mounting device 3, the ultrasonic sensor 1 can be mounted to the flow path 5 through a one-touch operation without using the adhesive agent 4.

Although an example in which the ultrasonic sensor 1 including the substantially circular disk formed with the notch 2 is fixed to the flow path 5 by means of the mounting device 3 is shown in FIGS. 4A and 4B, the ultrasonic sensor 1 including the semicircular disk formed with the notch 2 may also be fixed to the flow path 5 by means of the mounting device 3.

More than two ultrasonic sensors 1 are preferably mounted to the outer periphery of the flow path 5 with the adhesive agent 4 or by means of the mounting device 3.

Figure 5:
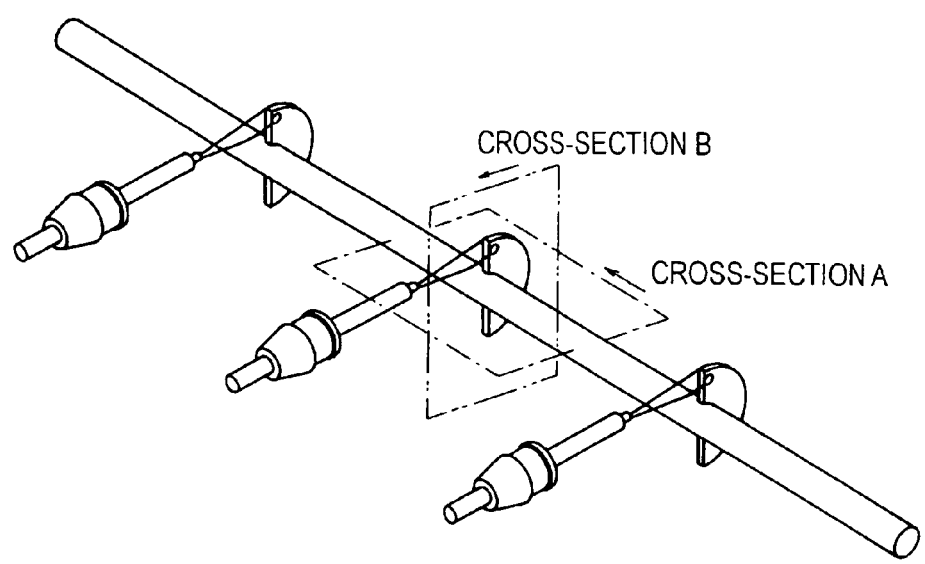
FIG. 5 is a perspective view showing a state in which the ultrasonic sensor is fixed to the flowpath with an adhesive agent.
Figures 6A, 6B:
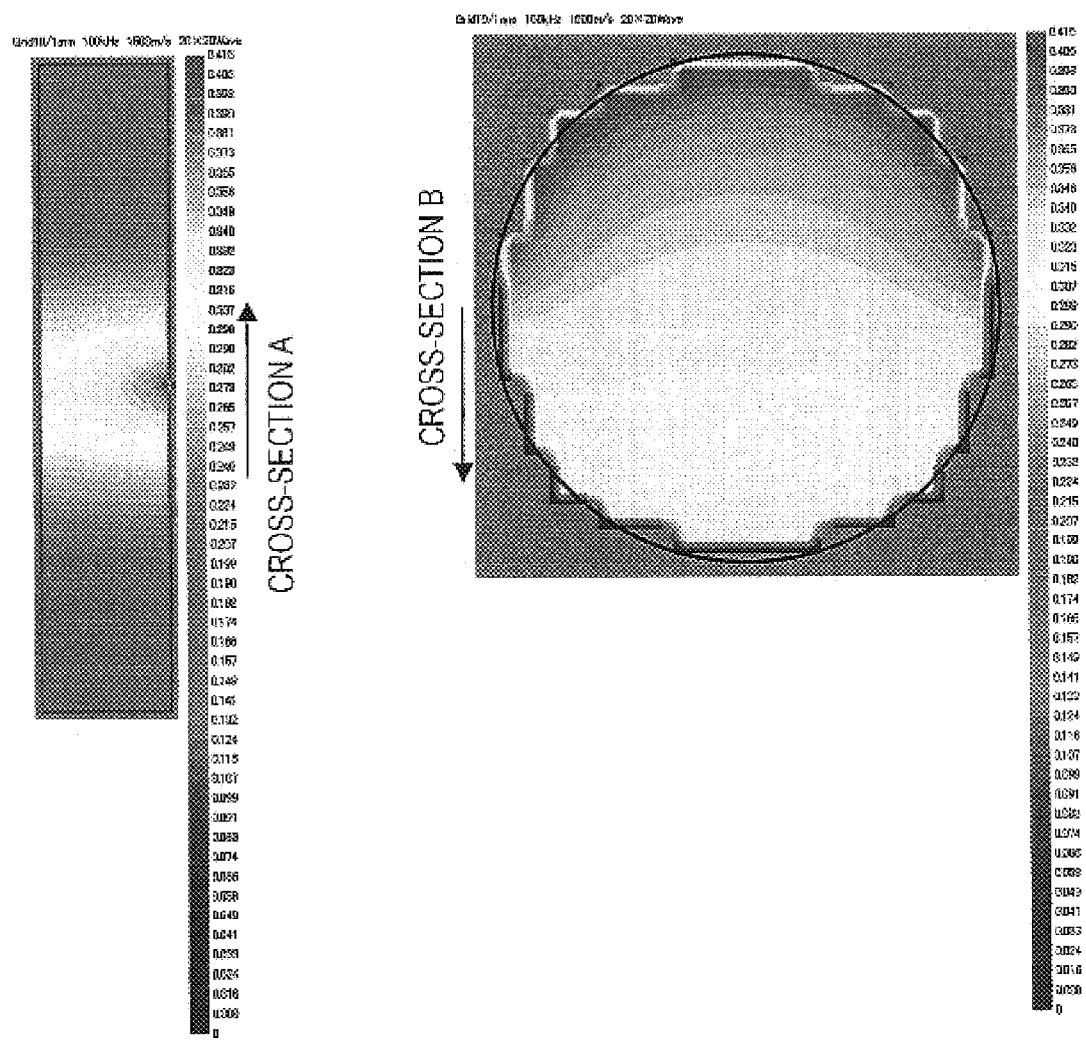
FIG. 6A shows a result of a three-dimensional calculation of sound pressure distribution showing propagation of the ultrasonic wave based on Cellular Automaton (CA) on a cross section A in FIG. 5.
FIG. 6B shows a result of a three-dimensional calculation of sound pressure distribution showing propagation of the ultrasonic wave based on Cellular Automaton (CA) on a cross section B in FIG. 5.

Wave motion of the ultrasonic waves emitted by the ultrasonic sensor 1 will be described. Generally, the sound source of an ultrasonic wave may be considered to be a group of minute point sound sources. The respective point sound sources are vibrated and the waves formed thereby overlap with each other to form a wave surface. The ultrasonic sensor 1 of the ultrasound flow meter according to the present invention may be considered in the same manner. In other words, a contact point between the flow path 5 and the notch 2 of the ultrasonic sensor 1 is the sound source, and when the sound source vibrates in the radial direction of the ultrasonic sensor 1, the wave generated by the vibration thereof is propagated in fluid in the flow path 5. Since the oscillating wave from the ultrasonic sensor 1 is propagated as a spherical wave, the ultrasonic wave is propagated in all directions in the flow path 5, including a wave propagated in the radial direction of the ultrasonic sensor 1 and a wave propagated to the upstream and the downstream directions in the flow path 5. The ultrasonic wave has such a nature that even when a plurality of ultrasonic waves collide, they do not affect each other, and their direction, amplitudes, and wavelength are not changed (Independency of Wave). Therefore, the ultrasonic wave emitted by the ultrasonic sensor 1 is propagated directly in the upstream and the downstream directions in the flow path 5 and is directly detected as a signal by another one of the ultrasonic sensors 1. By contrast, ultrasonic waves which are propagated toward the center of the flow path 5, and which are then redirected at a right angle, and then propagated in the upstream and the downstream directions in parallel with the flow path 5 are not detected. Therefore, even when the ultrasonic sensor 1 has a notch, the sound wave can be propagated in the upstream and the downstream direction. FIG. 6A and 6B show a result of a three-dimensional calculation of sound pressure distribution showing propagation of an ultrasonic wave based on Cellular Automaton (CA). FIG. 5 is a perspective view showing a state in which the ultrasonic sensors are fixed to the flow path with adhesive agent; FIG. 6A shows a result of calculation on a cross section A in FIG. 5, and FIG. 6B shows a result of calculation on a cross section B in FIG. 5, in which the contact portion between the flow path 5 and the ultrasonic sensor 1 is considered to be a sound source surface, and is divided into minute portions for calculation. In FIGS. 6A and 6B, measurement is conducted by using a tube of having an outer diameter of 3 mm and an inner diameter of 2 mm as the flow path, fluid flowing in the flow path at a rate of 1500 m/s, and an ultrasonic wave having a frequency of 100 kHz. It is clear from these drawings that the ultrasonic wave emitted by the ultrasonic sensor 1 is propagated as a spherical wave directly in the upstream and the downstream directions of the flow path 5.

Subsequently, the ultrasonic flow meter for measuring the flow rate by driving the ultrasonic sensor 1 will be described.

Figure 7:
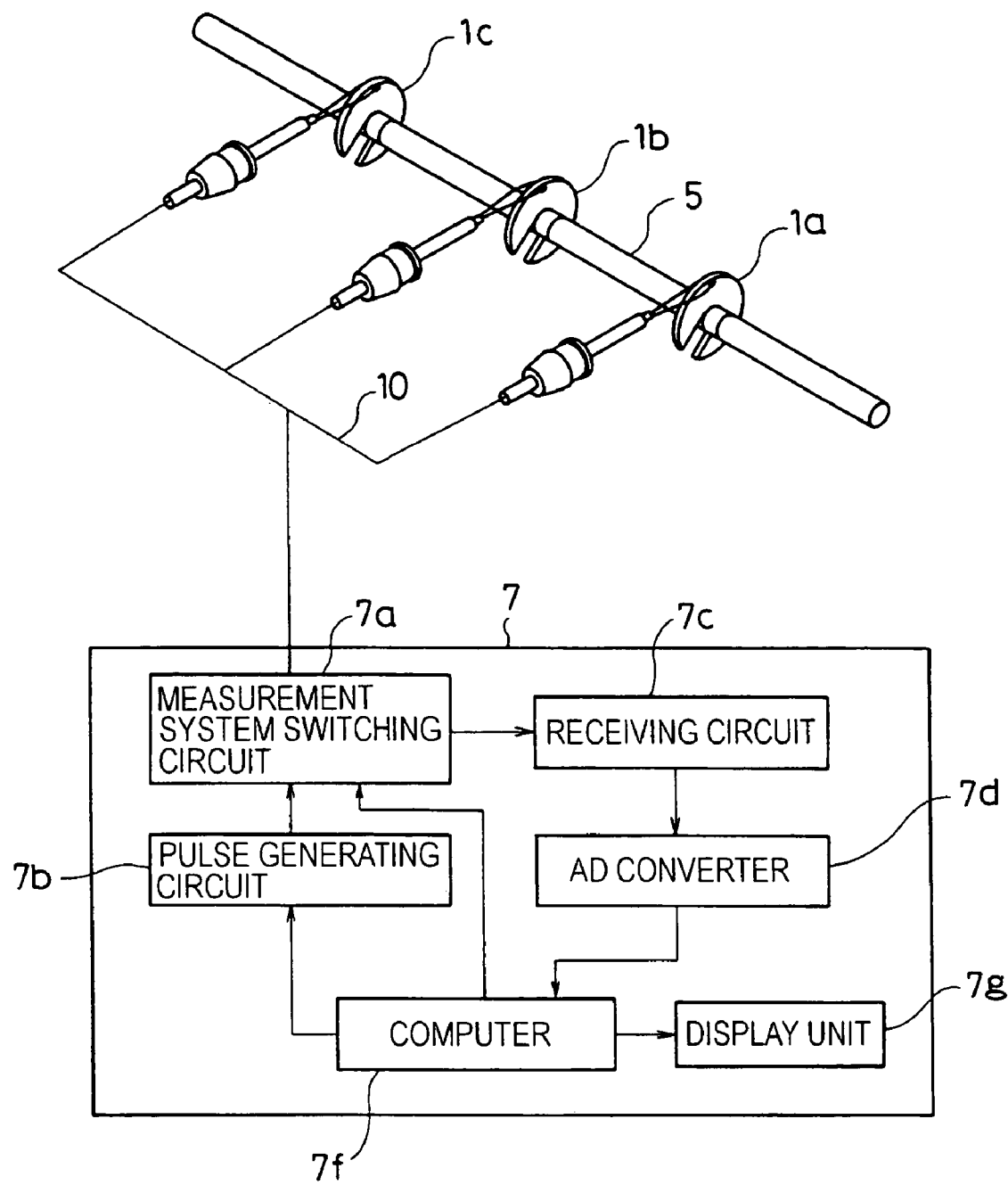
FIG. 7 is a block diagram of a control unit of the ultrasonic flow meter.

FIG. 7 is a block diagram of a control unit 7 of the ultrasonic flow meter, the control unit 7 controlling a plurality of ultrasonic sensors 1. As shown in FIG. 7, the control unit 7 includes a measuring system switching circuit 7a for selecting ultrasonic sensors for transmitting the ultrasonic wave and for receiving the ultrasonic wave from the ultrasonic sensors 1a, 1b, and 1c, a pulse generating circuit 7b for generating a pulsed drive signal in the transducer of the selected ultrasonic sensor, a receiving circuit 7c for receiving the signal from the selected ultrasonic sensor, an AD converter 7d for converting signal outputted from the receiving circuit 7c into digital data, a computer 7f for controlling transmission and reception of the ultrasonic sensor and calculating the flow rate from received digital data, and a display unit 7g for displaying the measured flow rate and the like.

Subsequently, referring to flow charts shown in FIG. 8 and FIG. 9, measurement of delay time required when the control unit 7 shown in FIG. 7 calculates the flow rate will be described.

Figure 8:
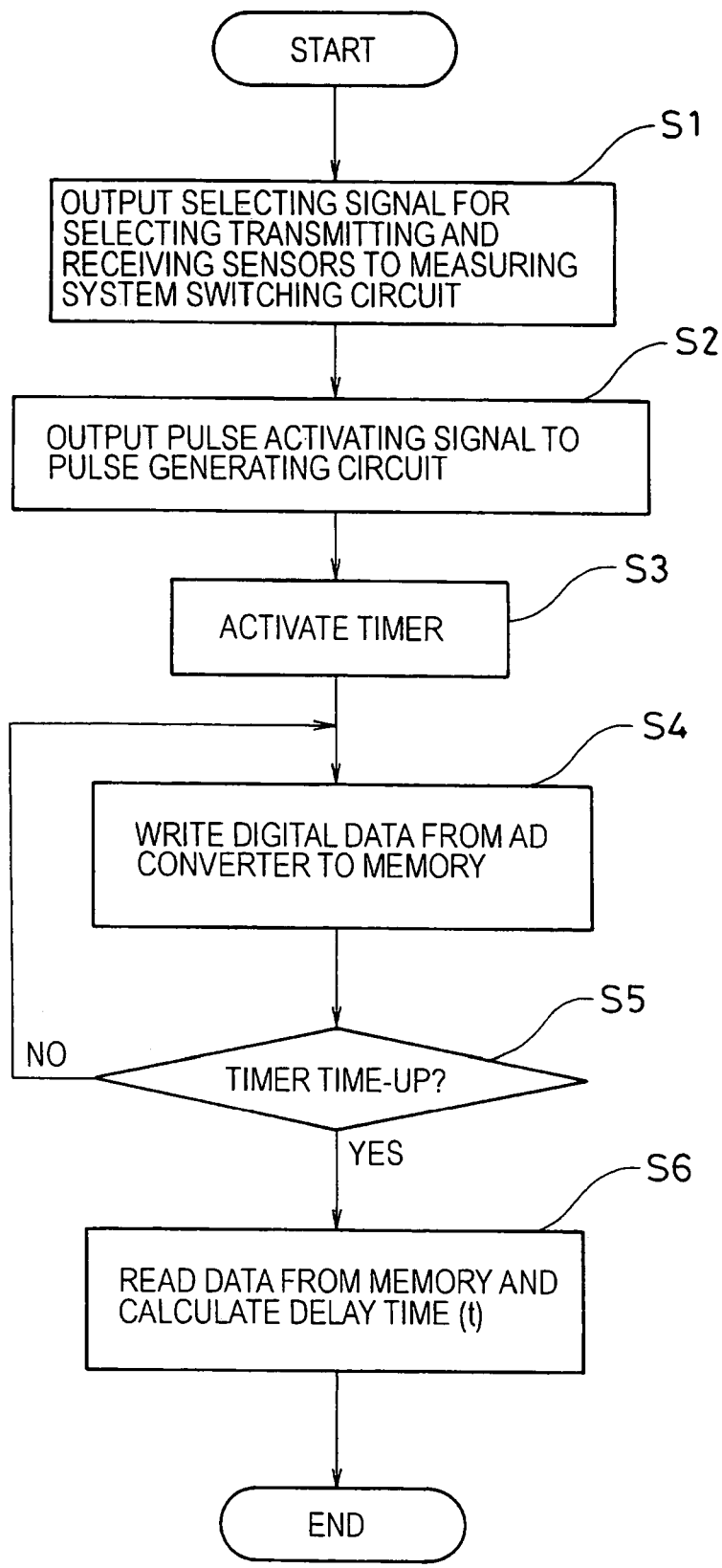
FIG. 8 is a flowchart relating measurement of delay time required when the control unit calculates the flow rate.
Figure 9:
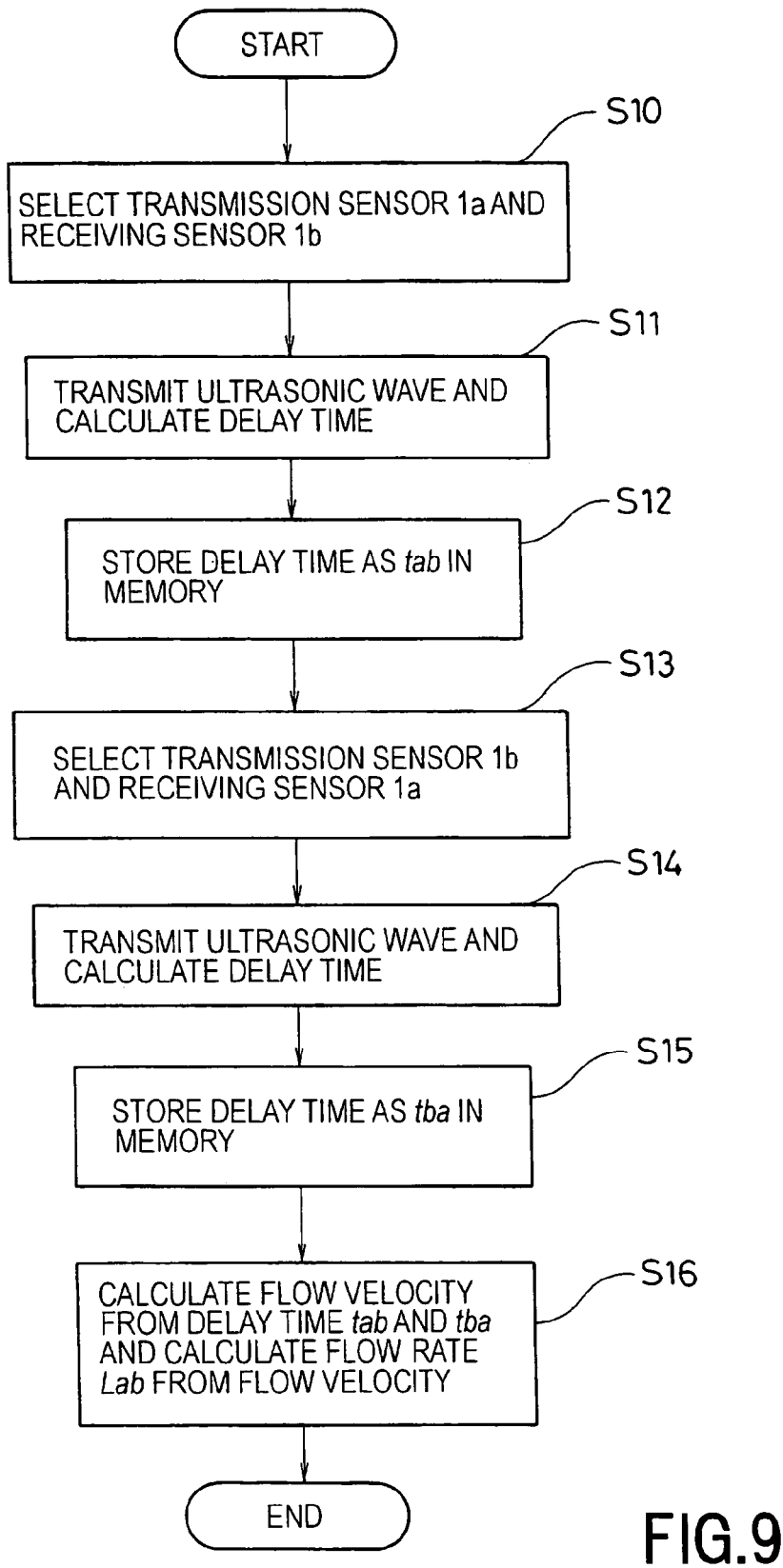
FIG. 9 is a flowchart relating measurement of the flow rate in the case in which three ultrasonic sensors are mounted to the outer periphery of the flow path.
Figure 10A:
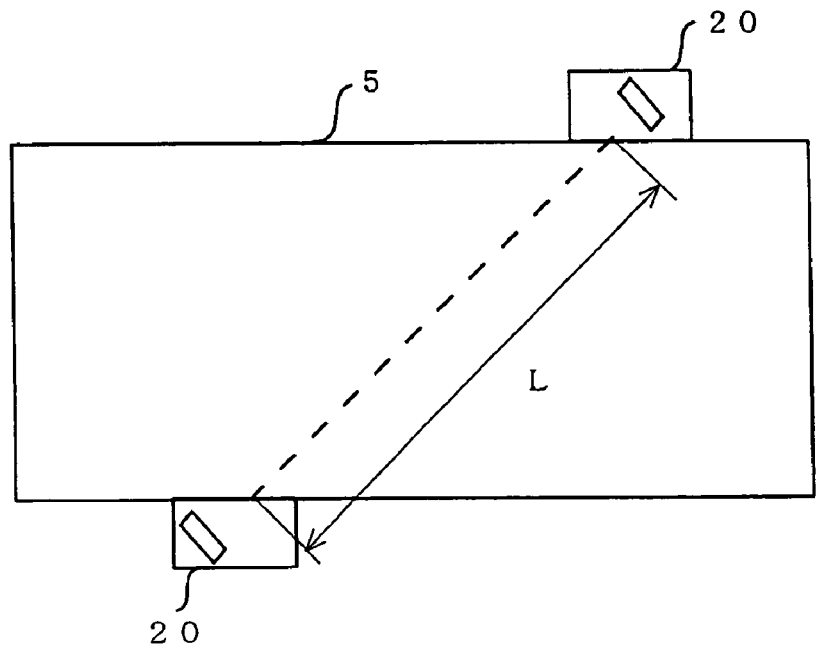
FIG. 10A shows a length L between the ultrasonic sensors in the arrangement of the clamp-on ultrasonic sensors of the ultrasonic flow meter according to the prior art.
Figure 10B:
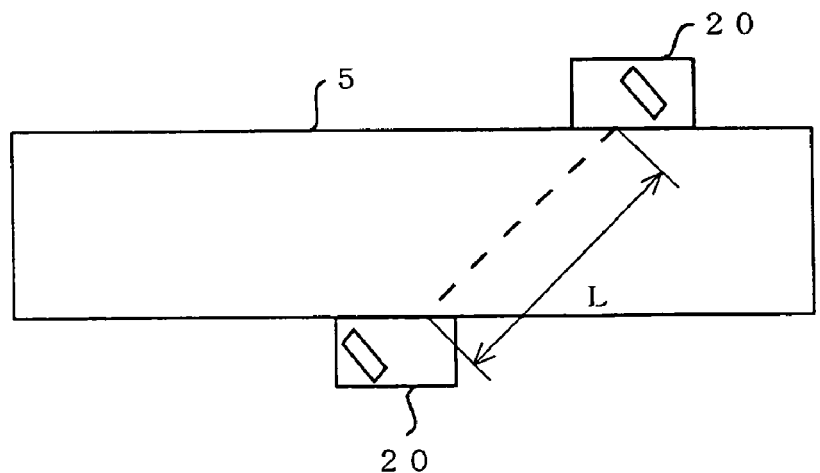
FIG. 10B shows the length L between the ultrasonic sensors in the arrangement in which the aperture of the flow path is reduced according to the prior art.

As shown in FIG. 8, the computer 7f outputs a sensor selection signal for selecting the ultrasonic sensors 1 for transmitting and for receiving the ultrasonic wave to the measuring system switching circuit 7a (Step S1). Then, the computer 7f outputs a pulse-activating signal for allowing the selected ultrasonic sensor 1 to transmit the ultrasonic wave to the pulse generating circuit 7b (Step S2). After having outputted the pulse-activating signal to the pulse generating circuit 7b, the computer 7f activates a timer built in the computer 7f to perform clocking (Step S3). The pulsed drive signal outputted from the pulse generating circuit 7b is applied to the ultrasonic sensor 1 for transmission from the measuring system switching circuit 7a. The timer is adapted to notify the CPU of the computer 7f that a preset time period has elapsed immediately after the elapse thereof.

The signal from the ultrasonic sensor 1 for reception is entered into the receiving circuit 7c via the measuring system switching circuit 7a. The receiving circuit 7c performs amplification and noise processing of the signal and outputs it to the AD converter 7d. The AD converter 7d converts the analogue signal received from the receiving circuit 7c into digital data and outputs it to an input/output circuit of the computer 7f.

The computer 7f reads digital data from the AD converter 7d, which is connected to the input/output circuit, and stores received digital data to a memory (Step S4). The computer 7f reads digital data at predetermined time intervals from the AD converter 7d and stores in the memory continuously while incrementing the address of the memory. The computer 7f continues this operation until receiving a time-up signal from the timer (Step S5).

The computer 7f reads data from the address in which digital data received from the AD converter 7d is stored in sequence after receiving the time-up signal from the timer, compares read data with a reference value which is set in advance, determines the address of the memory having data exceeding the reference value, and calculates a delay time. Since digital data from the AD converter 7d is written into the address of the memory at predetermined time intervals, the delay time is calculated by calculating an offset value of the address from the first address where data was written for the first time, and multiplying the time intervals of writing (Step S6).

Subsequently, referring to a flowchart shown in FIG. 9, measurement of the flow rate in the case where three ultrasonic sensors 1a, 1b, and 1c shown in FIG. 7 are mounted to the outer periphery of the flow path 5 will be described.

The computer 7f outputs a signal to the measuring system switching circuit 7a so as to select the ultrasonic sensor 1a for transmission and the ultrasonic sensor 1b for reception (Step S10). Then, the delay time calculating process shown in the flowchart in FIG. 8 is performed to calculate the delay time (Step S1). The calculated delay time is stored as tab in the memory (Step S12).

Subsequently, the computer 7f outputs a signal to the measuring system switching circuit 7a so as to select the ultrasonic sensor 1b for transmission and the ultrasonic sensor 1a for reception (Step S13). Subsequently, the delay time calculating process shown in the flowchart in FIG. 8 is performed to calculate the delay time (Step S14). The calculated delay time is stored as tba in the memory (Step S15). The flow velocity is calculated from the delay time tab and the delay time tba, and then the flow rate Lab is obtained from the flow velocity.

In the same procedure as described above, the respective flow rate Lac and Lbc are obtained from the combinations of the ultrasonic sensors 1a and 1c, and the ultrasonic sensors 1b and 1c, and then the average value of the Lab, Lac and Lbc is calculated to obtain the flow rate L. Consequently, the obtained flow rate is higher in the degree of accuracy in comparison with the flow rate obtained from a pair of ultrasonic sensors 1. By measuring the flow rate with the plurality of combinations of ultrasonic sensors, errors of measurement resulting from the effect of the pulsated flow may be reduced.

As described thus far, according to the ultrasonic flow meter of the present invention, since the ultrasonic sensor 1 can be fixed to the flow path 5 with the adhesive agent 4 or may be mounted through the one-touch operation of the mounting device without disassembling piping of the flow path 5 by the provision of notch 2 on the ultrasonic sensor 1, the scope of application for measuring the flow rate may be enlarged.

In addition, since the ultrasonic sensors can be mounted to the flow path 5 at an increased distance as in the case of the ring-shaped ultrasonic sensor in the prior art, measurement of the flow rate may be performed with a high degree of accuracy.

Furthermore, since measurement by combining measured values from the pairs of sensors may be performed by disposing more than two sensors on the flow path, measurement with a high degree of accuracy is achieved also for transient flow including laminar flow, turbulent flow or pulsating flow.

Figure 11A:
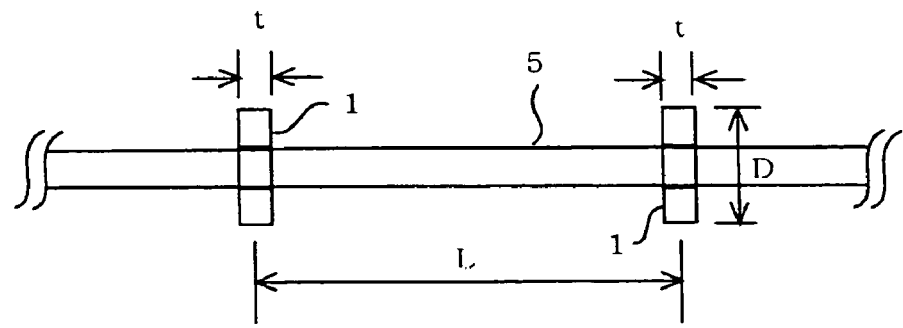
FIG. 11A shows the relationship between the thickness of and the mounting distance between the ultrasonic sensors of the ultrasonic flow meter according to the present invention.

As shown in FIG. 11A, by decreasing the thickness t and increasing the outer diameter D of the ultrasonic sensor 1, a resonance frequency may be maintained at a lower value while increasing the detection resolution. By maintaining the resonance frequency at a lower value, attenuation of ultrasonic vibrations may be controlled, and thus a high degree of accuracy is achieved.

For example, assuming that the reference value s of the detection resolution of the ultrasonic sensor 1 is 1/100, by determining the ratio of the thickness t of the ultrasonic sensor shown in FIG. 11A with respect to the length L between the sensors (t/L) to be 1/100 or below, errors resulting from the detection resolution may be maintained below 1/100.

Figure 11B:
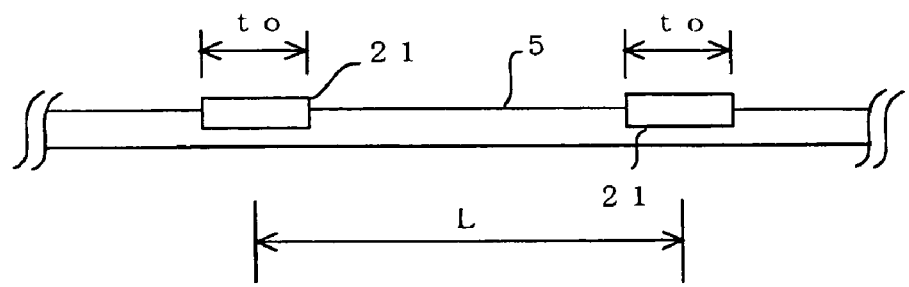
FIG. 11B shows the relationship between the thickness of and the mounting distance between the ultrasonic sensors of the ultrasonic flow meter according to the prior art.

By contrast, FIG. 11B shows the thickness $t_o$ of the ultrasonic sensor 21 and the length L between the sensors of the prior art. Since the thickness $t_o$ of the ultrasonic sensor 21 in the prior art in the direction of the length of the flow path 5 (the direction of liquid flow) is large, detection resolution of the ultrasonic sensor 21 is lowered.

In the ultrasonic flow meter using the ring-shaped sensor in the prior art, ultrasonic waves are converged from the circumference of the ring sensor to the center point of the flow path and are then redirected in a perpendicular direction and propagated in the upstream and the downstream directions of the flow path.

According to the ultrasonic flow meter of the present invention, since the thickness of the ultrasonic sensor in the direction of the flow path may be reduced, detection resolution may be improved, and the directivity of the ultrasonic wave from the ultrasonic sensor increases. Thus, the ultrasonic waves are directly propagated in the direction along the flow path. Consequently, sensitivity to transmission of the ultrasonic waves is improved and the effect of the noise or the like may be reduced, whereby measurement with a high degree of accuracy is achieved.

Using the ultrasonic flow meter arranged as described above, measurement of the flow rate with a flow path having an inner diameter of 0.5 mm and measurement of a minimum flow velocity of 0.1 m/s for calculating the flow rate has been conducted, and effectiveness of the ultrasonic flow meter according to the present invention has been verified.

What is claimed is:

1. An ultrasonic flow meter comprising:
    at least two ultrasonic sensors each for emitting and detecting ultrasonic waves;
    wherein the ultrasonic sensors are disposed at a predetermined interval in a length direction of a flow path so as to measure a flow rate from a difference in propagation times of the ultrasonic waves between the ultrasonic sensors;
    wherein the ultrasonic sensors each comprise a semicircular disk shaped transducer having a notch which comes into tight contact with an envelope of the flow path so as to be detachably mounted on the envelope of the flow path;
    wherein the ultrasonic waves which are emitted from the ultrasonic sensors are propagated in all directions as spherical waves, including directly along the flow path in upstream and downstream directions so as to be directly detected by each other; and
    wherein a ratio (t/L) of a thickness t of the ultrasonic sensors in the length direction of the flow oath to a length L between the ultrasonic sensors does not exceed a reference value of a detection resolution of the ultrasonic sensors.

2. The ultrasonic flow meter according to claim 1, wherein the notch is semicircular so as to be detachably mounted on a semicircular portion of the envelope of the flow path.

3. The ultrasonic flow meter according to claim 1, wherein the ultrasonic flow meter comprises at least three ultrasonic sensors which are disposed at predetermined intervals along the length direction of the flow path.

4. The ultrasonic flow meter according to claim 1, wherein the ultrasonic sensors are fixed to the envelope of the flow path with an adhesive agent so as to come into tight contact with a semicircular portion of the envelope of the flow path.

5. The ultrasonic flow meter according to claim 1, wherein the ultrasonic sensors are fixed to the envelope of the flow path by a mounting device having a resilient member such that the notches of the transducers come into tight contact with a semicircular portion of the envelope of the flow path.

6. An ultrasonic flow meter comprising:
    at least two ultrasonic sensors each for emitting and detecting ultrasonic waves;
    wherein the ultrasonic sensors are disposed at a predetermined interval in a length direction of a flow path so as to measure a flow rate from a difference in propagation times of the ultrasonic waves between the ultrasonic sensors;
    wherein the ultrasonic sensors each comprise a substantially circular disk shaped transducer having a notch, and the ultrasonic sensors are detachably mounted on an envelope of the flow path;
    wherein the ultrasonic waves which are emitted from the ultrasonic sensors are propagated in all directions as spherical waves, including directly along the flow path in upstream and downstream directions so as to be directly detected by each other; and
    wherein a ratio (t/L) of a thickness t of the ultrasonic sensors in the length direction of the flow path to a length L between the ultrasonic sensors does not exceed a reference value of a detection resolution of the ultrasonic sensors.

7. The ultrasonic flow meter according to claim 6, wherein the ultrasonic sensors are detachably mounted on the envelope of the flow path such that a center of the flow path is substantially aligned with a center of the substantially circular disk shaped transducer.

8. The ultrasonic flow meter according to claim 6, wherein the ultrasonic flow meter comprises at least three ultrasonic sensors which are disposed at predetermined intervals along the length direction of the flow path.

9. The ultrasonic flow meter according to claim 6, wherein the ultrasonic sensors are fixed to the envelope of the flow path with an adhesive agent such that the notch of the transducer comes into tight contact with a semicircular portion of the envelope of the flow path.

10. The ultrasonic flow meter according to claim 6, wherein the ultrasonic sensors are fixed to the envelope of the flow path by a mounting device having a resilient member such that the notches of the transducers come into tight contact with a semicircular portion of the envelope of the flow path.

11. An ultrasonic sensor for measuring a flow rate in a flow path, the ultrasonic sensor comprising a disk shaped transducer having a notch which comes into tight contact with an envelope of the flow path so as to be detachably mounted to the envelope of the flow path, wherein a ratio (t/L) of a thickness t of the ultrasonic sensor in a length direction of the flow oath to a length L between the ultrasonic sensor and an additional ultrasonic sensor does not exceed a reference value of a detection resolution of the ultrasonic sensor.

12. The ultrasonic sensor according to claim 11, wherein the notch is semicircular so as to be detachably mounted on a semicircular portion of the envelope of the flow path.

13. An ultrasonic sensor for measuring a flow rate in a flow path, the ultrasonic sensor comprising a substantially circular disk shaped transducer having a notch, wherein ultrasonic sensors are detachably mounted on an envelope of the flow path, wherein a ratio (t/L) of a thickness t of the ultrasonic sensor in a length direction of the flow path to a length L between the ultrasonic sensor and an additional ultrasonic sensor does not exceed a reference value of a detection resolution of the ultrasonic sensor.

14. The ultrasonic sensor according to claim 13, wherein the ultrasonic sensor is detachably mounted on the envelope of the flow path such that a center of the flow path is substantially aligned with a center of the substantially circular disk shaped transducer.

* * * * *